(12) United States Patent
Givens et al.

(10) Patent No.: US 11,981,400 B2
(45) Date of Patent: May 14, 2024

(54) SUCTIONING WATERCRAFT FENDER

(71) Applicant: Wake Shack, LLC, Wabash, IN (US)

(72) Inventors: Ryan G. Givens, Wabash, IN (US);
Thad J. Eads, Urbana, IN (US);
Russell Waldon, Wabash, IN (US)

( * ) Notice: Subject to any disclaimer, the term of this patent is extended or adjusted under 35 U.S.C. 154(b) by 228 days.

(21) Appl. No.: 17/335,506

(22) Filed: Jun. 1, 2021

(65) Prior Publication Data

US 2021/0371051 A1 Dec. 2, 2021

Related U.S. Application Data

(60) Provisional application No. 63/032,937, filed on Jun. 1, 2020.

(51) Int. Cl.
B63B 21/00 (2006.01)
E02B 3/26 (2006.01)

(52) U.S. Cl.
CPC ............... B63B 21/00 (2013.01); E02B 3/26 (2013.01); *B63B 2021/001* (2013.01); *B63B 2021/006* (2013.01)

(58) Field of Classification Search
CPC ...... B63B 21/00; B63B 2021/006; E02B 3/26
See application file for complete search history.

(56) References Cited

U.S. PATENT DOCUMENTS

| 3,974,794 A | * | 8/1976 | Kakitani | B63B 59/02 |
| | | | | 114/230.17 |
| 5,676,085 A | * | 10/1997 | Michl, Jr. | B63B 21/00 |
| | | | | 114/230.17 |
| 6,561,113 B2 | * | 5/2003 | Leise | B63B 21/00 |
| | | | | 114/221 R |
| 6,666,420 B1 | * | 12/2003 | Carnevali | F16B 47/00 |
| | | | | 248/205.8 |
| 7,229,059 B1 | * | 6/2007 | Hood | F16M 13/022 |
| | | | | 248/205.8 |
| 7,293,519 B2 | * | 11/2007 | Montgomery | B63B 21/00 |
| | | | | 114/230.1 |

(Continued)

FOREIGN PATENT DOCUMENTS

| CN | 205891166 | 1/2017 |
| CN | 207228063 | 4/2018 |

OTHER PUBLICATIONS

Amazon; FCHO Glass Suction Cups Heavy Duty Aluminum Vacuum Plate Handle Glass Holder Hooks to Lift Large Glass/Floor Gap Fixer/Tile Suction Cup Lifter/Moving Glass/Pad for Lifting/Dent Puller (2 Pack); Retrieved from <https://www.amazon.com/FCHO-Suction-Aluminum-Vacuum-Lifting/dp/B07HNRB2CJ> on Sep. 12, 2019.

*Primary Examiner* — S. Joseph Morano
*Assistant Examiner* — Jovon E Hayes
(74) *Attorney, Agent, or Firm* — Frost Brown Todd LLP

(57) ABSTRACT

A suctioning watercraft fender attaches to a watercraft while the watercraft is in a mooring state. The watercraft fender may couple a first watercraft to a second watercraft or a first watercraft to a fixed surface. The watercraft fender includes a body defining a longitudinal axis, wherein the body includes first and second opposing ends. The fender further includes a first coupling member coupled to the first end of the body. The first coupling member includes a first suction cup and a first pressure mount actuatable to selectively lock or release the first suction cup from a first surface.

18 Claims, 12 Drawing Sheets

(56) References Cited

U.S. PATENT DOCUMENTS

| | | | |
|---|---|---|---|
| 7,637,222 B1* | 12/2009 | Keely | B63B 21/00 |
| | | | 114/230.17 |
| 7,827,924 B1* | 11/2010 | Perez | B63B 21/00 |
| | | | 114/230.15 |
| 9,027,496 B2* | 5/2015 | Zucco | E02B 3/20 |
| | | | 114/230.15 |
| 9,199,696 B1* | 12/2015 | Bonell | B63B 21/00 |
| 11,319,029 B2* | 5/2022 | Logan | B63B 21/00 |
| 11,319,031 B1* | 5/2022 | Perry | B63B 59/00 |
| 2009/0230686 A1* | 9/2009 | Catlin | F03B 13/264 |
| | | | 290/54 |
| 2016/0340948 A1* | 11/2016 | McCullough | E05C 19/00 |
| 2021/0214047 A1* | 7/2021 | Gonzales | B63B 21/00 |
| 2021/0371051 A1* | 12/2021 | Givens | E02B 3/26 |

* cited by examiner

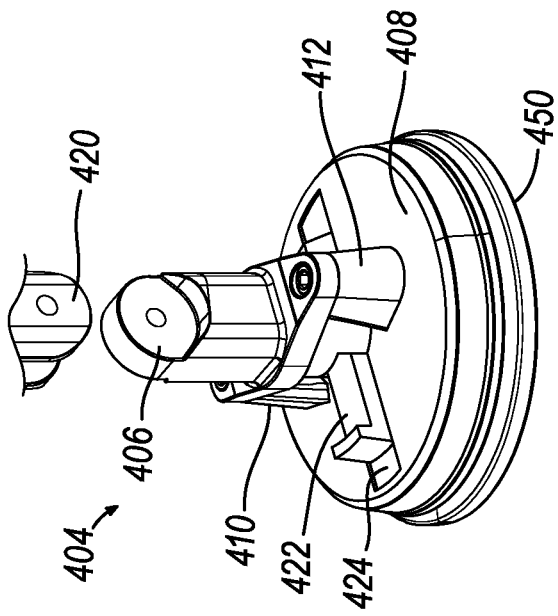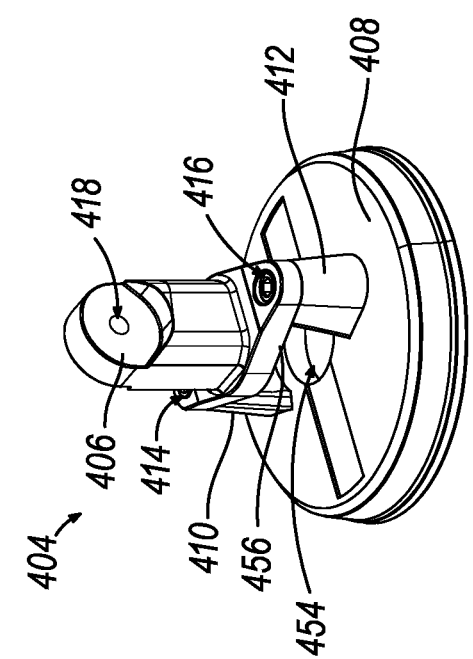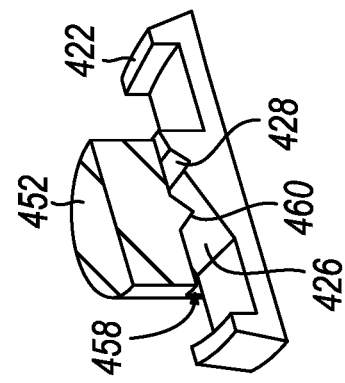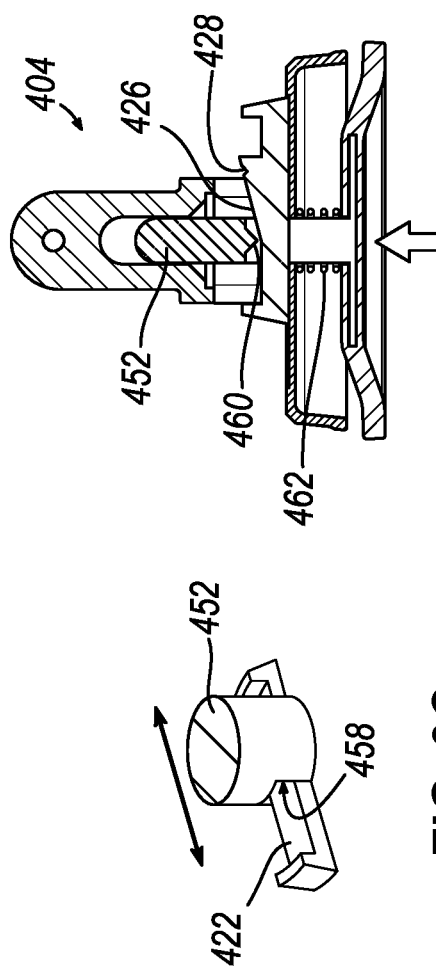
FIG. 9A
FIG. 9B
FIG. 9C
FIG. 9D
FIG. 9E

SUCTIONING WATERCRAFT FENDER

PRIORITY

This application claims the benefit of U.S. Provisional Application No. 63/032,937, filed Jun. 1, 2020, and titled "Suctioning Watercraft Fender," the disclosure of which is incorporated by reference herein.

TECHNICAL FIELD

Embodiments of this disclosure relate generally to watercraft fenders, and more particularly, to watercraft fenders configured to couple with one or more watercrafts using suctioning.

BACKGROUND

The present invention pertains to fenders for watercraft vessels (herein referred to as "boats"), and more particularly to fenders which are suitable for protecting the hull of the boat during mooring, whether to a mooring dock structure or to another boat (often referred to as "tying up" or "rafting up" two boats). As should be understood, boat fenders may also be commonly referred to as "bumpers" or "mooring devices." When a boat is being moored, it is common to place two or more fenders along the same side of the hull of the boat—one positioned near the front and one positioned near the rear—to provide cushion and spacing between the boat from the dock, or in some instances, to provide cushion and spacing between the boat and another nearby boat. Specifically, fenders may act to cushion the boat from making any damaging impact (i.e., absorb the kinetic energy) with the dock and/or with another boat. Typically, fenders are cylindrical tubes comprised of marine grade vinyl, rubber, foam, elastomer, plastic, and/or other durable and deformable materials, and is some variations are inflatable and deflatable. The fenders are generally coupled with ropes and secured to a railing or cleat of the boat that is positioned vertically above an area of the boat which requires cushioning during mooring, and the fender hangs via the rope and lays against that area to deform and absorb any contact with other boats or with docks.

However, traditional fenders are bulky and take up valuable storage space on boats. Further, traditional fenders can be cumbersome for a single user to quickly and adequately position on the hull of the boat while the boat is approaching a dock or another boat as the fenders typically require the user to accurately place the fender in a particular vertical position relative to the hull while simultaneously tying the rope to a railing or cleat.

Accordingly, it was realized by the inventors of the current disclosure that improvements in watercraft fenders are needed.

SUMMARY

Embodiments of the present disclosure provide an improved suctioning watercraft fender. In accordance with a first aspect of embodiments of the present disclosure, a watercraft fender can include a flexible coil spring having first and second opposing ends, and a first coupling member coupled to the first end of the flexible coil spring. In alternative embodiments, a watercraft fender can include a rigid body having first and second opposing ends, and a first coupling member coupled to the first end of the flexible coil spring. The first coupling member can include a first suction cup and a first pressure mount actuatable to selectively lock or release the first suction cup from a first surface. In some embodiments, the first coupling member can be configured to pivot relative to the flexible coil spring about a pivot axis, wherein the pivot axis can be radial to the longitudinal axis. The first pressure mount can also be configured to translate the first suction cup about the longitudinal axis, wherein a translation of the first suction cup in a distal direction can be configured to engage the first suction cup to the first surface, wherein a translation of the first suction cup in a proximal direction can be configured to disengage the first suction cup from the first surface.

In some embodiments, the watercraft fender can further include a second coupling member pivotally coupled to the second end of the flexible coil spring, wherein the second coupling member can include a second suction cup and a second pressure mount operable to selectively lock or release the second suction cup from a second surface. Optionally, the flexible coil spring can include an outer casing, such as a shrink wrap, or similar material.

Other aspects of the embodiments can include a hollow cavity within the flexible coil spring, and a tube positioned therethrough the hollow cavity. The tube can be configured to trap air or another buoyant fluid which can provide floatation characteristics to the watercraft fender.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIGS. 9A-E depict a collection of assembly views of an alternative embodiment of the coupling member of the watercraft fender of FIG. 2;

DETAILED DESCRIPTION OF THE ILLUSTRATED EMBODIMENTS

Figure 1:
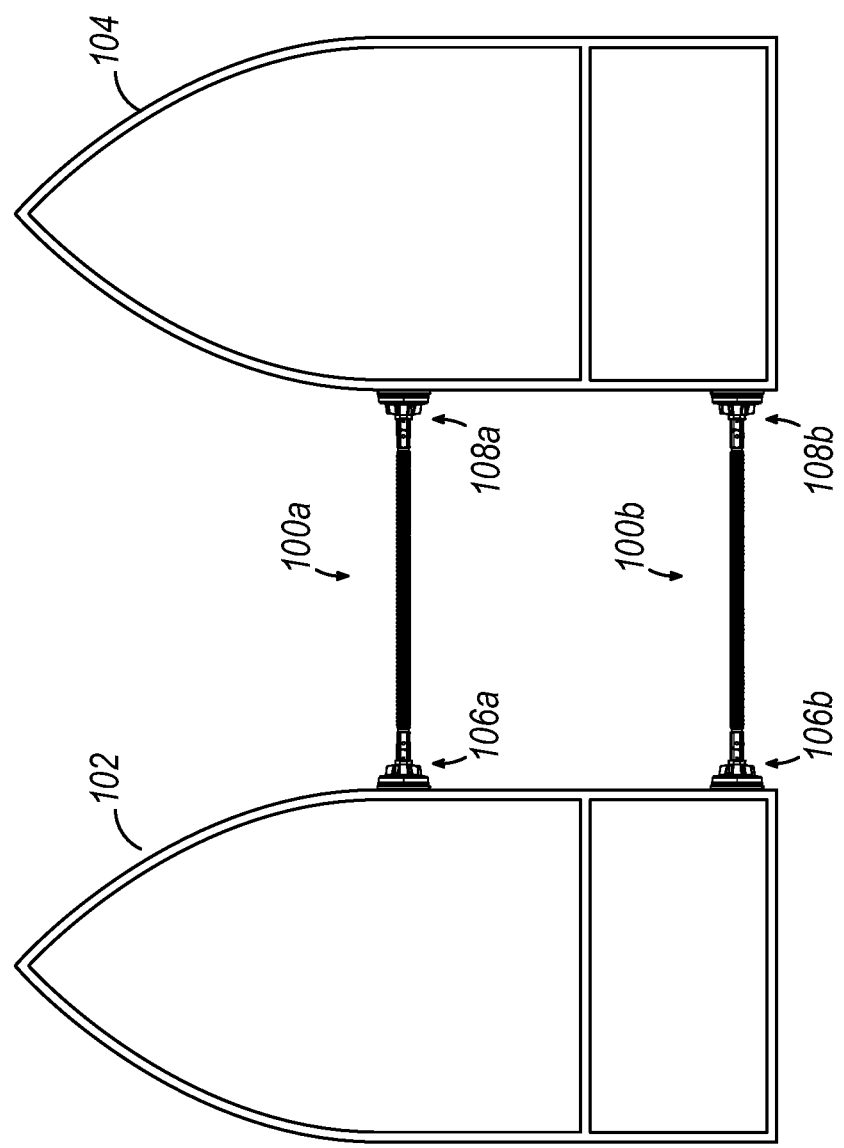
FIG. 1 depicts a top plan view of one environment of use including two watercraft fenders, each fender shown with coupling members positioned at each opposing end, with each coupling member coupled to the hull of a watercraft and configured to couple together two watercrafts during mooring.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Specific quantities (spatial dimensions, pressures, times, force, resistance, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present disclosure provide an improved suctioning watercraft fender for absorbing kinetic energy to prevent damage to a boat, for example, a recreational boat. Damage to a recreational boat may range from surface blemishes to structural compromises. A recreational boat as described herein comprises a boat having a length ranging from about 14 feet to about 35 feet. While this application describes recreational boats having a length ranging from about 14 feet to about 35 feet, the recreational boats may have smaller lengths or larger lengths. A recreational boat comprises cabin boats, deck boats, fishing boats, high performance boats, motor yachts, cruisers, jet boats, multi-hull power boats, personal watercrafts (e.g., Jet Ski), sportfishing boats, trawlers, walkarounds, ski boats, wake boats, surf boats, sailboats, pontoon boats, and the like. The fender may stored on the boat for use at a time of an event (e.g., docking, berthing, mooring, anchoring, etc.) to prevent damage from occurring to the boat.

In some embodiments, an elongated cylindrical tube with two fully enclosed ends is placed within the fender and covers substantially the entire length of the central portion of the fender. The cylindrical tube can be filled with air prior to installation such that the enclosed air pocket within the tube provides adequate buoyancy to allow the fender to float if dropped into the water.

Depicted in FIG. 1, two watercraft fenders (100a, 100b) are shown. Each fender (100a, 100b) is configured to couple with a first boat (102), for example, suctioning to the hull, at one end (106a, 106b) and is configured to couple with the hull of a second boat (104) at the opposing end (108a, 108b), thereby providing compressible cushioning between the first boat (102) and the second boat (104) and restricting the two boats (102, 104) from making contact, while also restricting the two boats (102, 104) from separating too far from one another. In some environments of use, such as use for tying up two recreational boats, more than one fender (100a, 100b), may be used, as shown in FIG. 1. Typically, when it is preferred to tie up two boats relatively closely to one another, a first fender (100a) is required to be positioned near the fronts of the two boats (102, 104) while a second fender (100b) is required to be positioned near the rears of the two boats (102, 104) to ensure the boats are unable to make contact while drifting in unsettled waters. However, it should be understood that only a single fender may be required in some circumstances, such as those involving one or more smaller watercrafts. Similarly, more than two fenders may be required in other circumstances, such as those involving one or more larger watercrafts.

Figure 2:
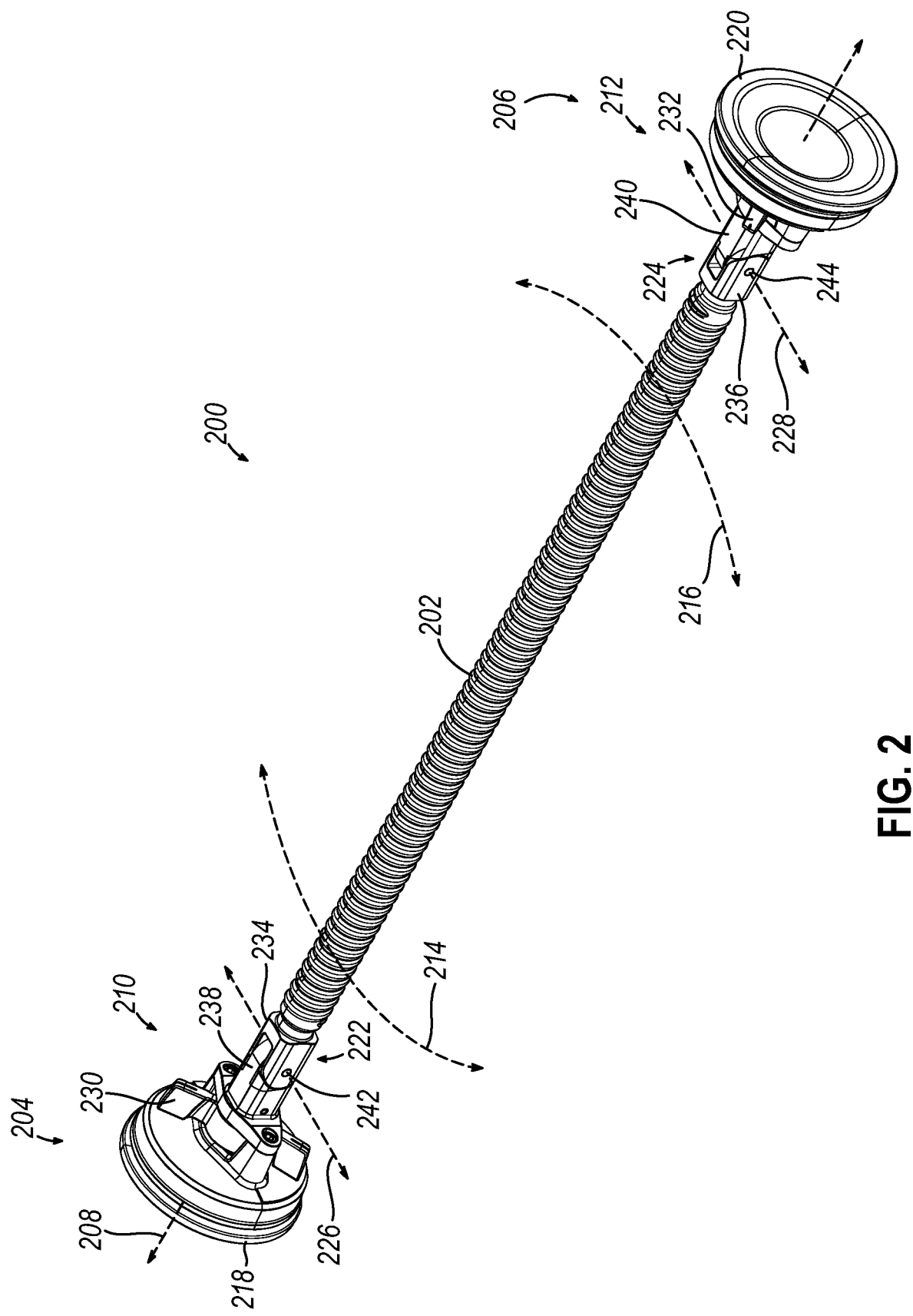
FIG. 2 depicts a perspective view of one embodiment of a watercraft fender, shown with coupling members positioned at each opposing end, with the coupling members uncoupled from mooring structures.

Depicted in FIG. 2 is one exemplary embodiment of a watercraft fender (200) which may be configured and operable just like fenders (100a, 100b) described above. Fender (200) includes an elongated body (202) and coupling members (204, 206) coupled at each end of the elongated body (202). The body (202) includes an inner coil spring (see, element 260 in FIG. 5), or piston, capable of compressing and expanding along its longitudinal axis (208). The body (202) can also include an inner tube (see, element 262 in FIG. 5) for trapping air (see, element 322 in FIGS. 6-7) and providing buoyancy for the fender (200) if it were to be dropped into water. In some embodiments, the inner coil spring (see, element 260 in FIG. 5) is covered by an outer casing (see, element 320 in FIG. 6-7), such as a shrink-wrap material. The shrink wrap can be comprised of an elastic or rubber-like material and can be operable to protect the spring and restrict items (such as debris or human hands) from being pinched by the spring during use, and it can also be operable to provide additional sealing to trap air and further promote buoyancy.

In addition to compressing and expanding along the longitudinal axis (208), either opposing end (210, 212) of the body (202) comprising the coil spring (see, element 260 in FIG. 5) may also deflect three-dimensionally, for example, along deflection paths (214, 216) as shown in FIG. 2. More specifically, while in use, the flexible body (202) permits three-axis movement between the boat-to-boat or boat-to-dock coupling, while also providing enough rigidity (i.e., a compression limit) to ensure the boats or the boat and dock remain adequately separated while coupled.

In alternative embodiments, the body (202) is formed as a rigid pipe. The body (202) in this embodiment can also include an inner tube (e.g., similar to element 262 in FIG. 5) for trapping air (see, element 322 in FIGS. 6-7) and providing buoyancy for the fender (200) if it were to be dropped into water.

As will be described in greater detail below, the coupling members (204, 206) can comprise suctioning devices (218, 220) operable to connect to the outer surface (i.e., the hull) of the boat. Because many recreational boats today are comprised of a fiberglass material, the suctioning devices (218, 220) can provide adequate suctioning ability to prevent detachment of the fender (200) from boats while the fender (200) is in use. For example, the suctioning devices (218, 220) may couple to and be moveable by one or more rotatable locking and release mechanisms, such as rotational drive members (230, 232), (otherwise referred to as "pressure mounts") to translate the suctioning devices (218, 220) axially in distal and proximal direction to increase or decrease suction pressure.

Because the fender (200) may be coupled with two boats floating in unsettled water, and/or because two boats may be of different sizes therefore requiring uneven vertical placement of the fender (200) on the hull of the first boat relative to the second boat, the fender (200) may require a pivotable coupling (222, 224) between the body (202) and each coupling member (204, 206) so not to cause undue stress at the point the body (202) connects to the coupling member (204, 206), and also to pivot as the boats drift thereby reducing the stress put on the flexible body (202) as the body deflects to absorb kinetic energy. For example, without a pivotable coupling (222, 224) between the body (102) and the coupling members (204, 206), a lighter (i.e., less durable) coil spring (see, element 260 in FIG. 5) within the body (102) is tasked with supporting a greater amount of stress or weight than it otherwise would with a pivotable coupling (222, 224). As such, each coupling member (204, 206) is configured to pivot, such as by a hinged connection, relative to the flexible body (102) about a pivot axis (226, 228), wherein each pivot axis (226, 228) is defined radial to the longitudinal axis (208). In some embodiments, pivotable coupling (222) can include a tube hinge or another similar hinge. The exemplary fender (200) includes body fittings (234, 236) coupled with coupling member fittings (238, 240) by bolts (242, 244). In some embodiments, pins or screws or other similar components may be substituted for bolts (242, 244).

Figure 3:
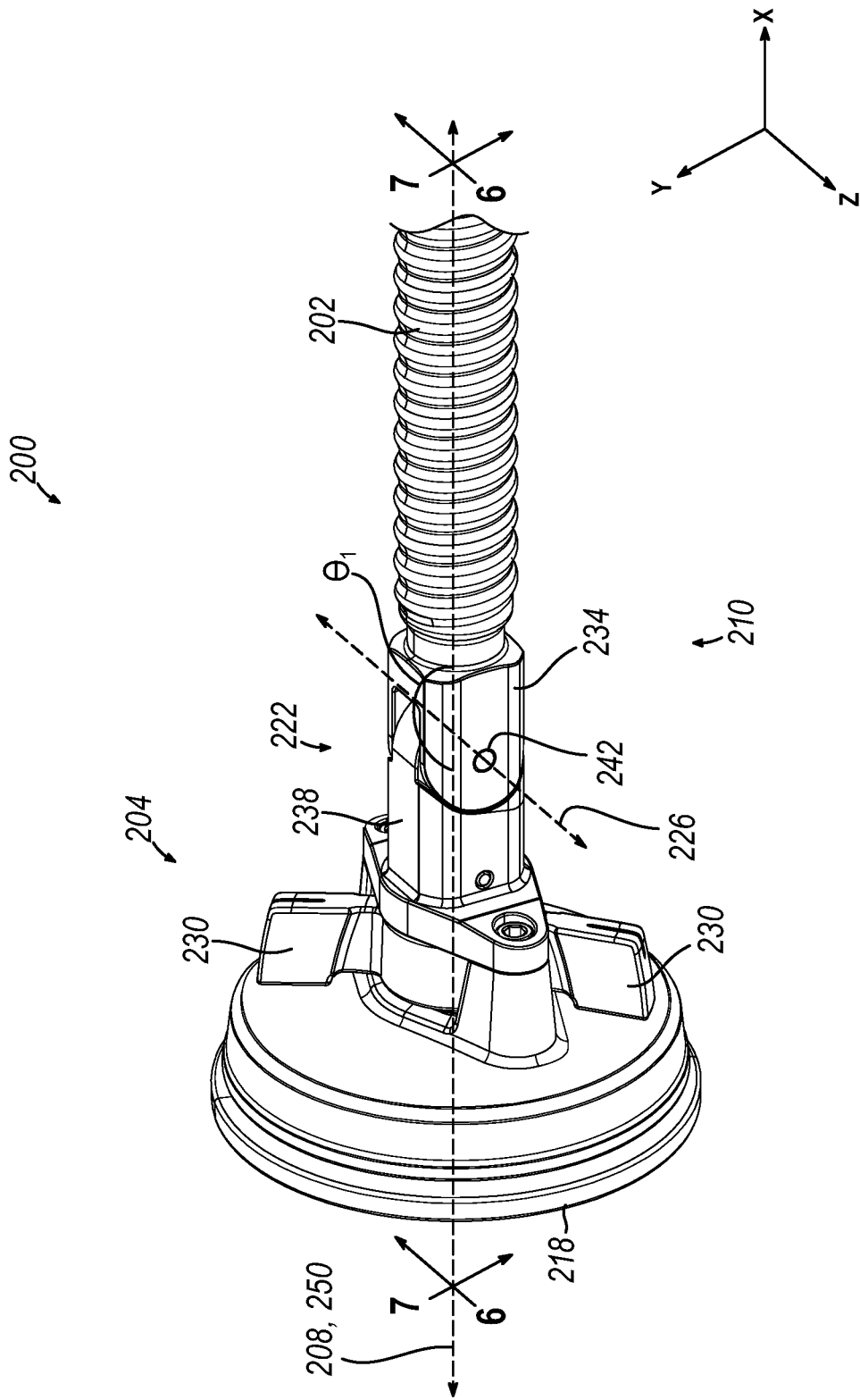
FIG. 3 depicts an enlarged, perspective view of a coupling member of FIG. 2, shown in an un-pivoted orientation.

Depicted in FIG. 3 is an enlarged view of coupling member (204), shown with pivotable coupling (222) in an un-pivoted orientation, wherein coupling member (204) defines an axis (250) with a pivot angle ($\Theta_1$) of 0 degrees relative to the longitudinal axis (208). More specifically, in the unpivoted orientation, the coupling member (204) is arranged in axial alignment with the body (202).

Figure 4:
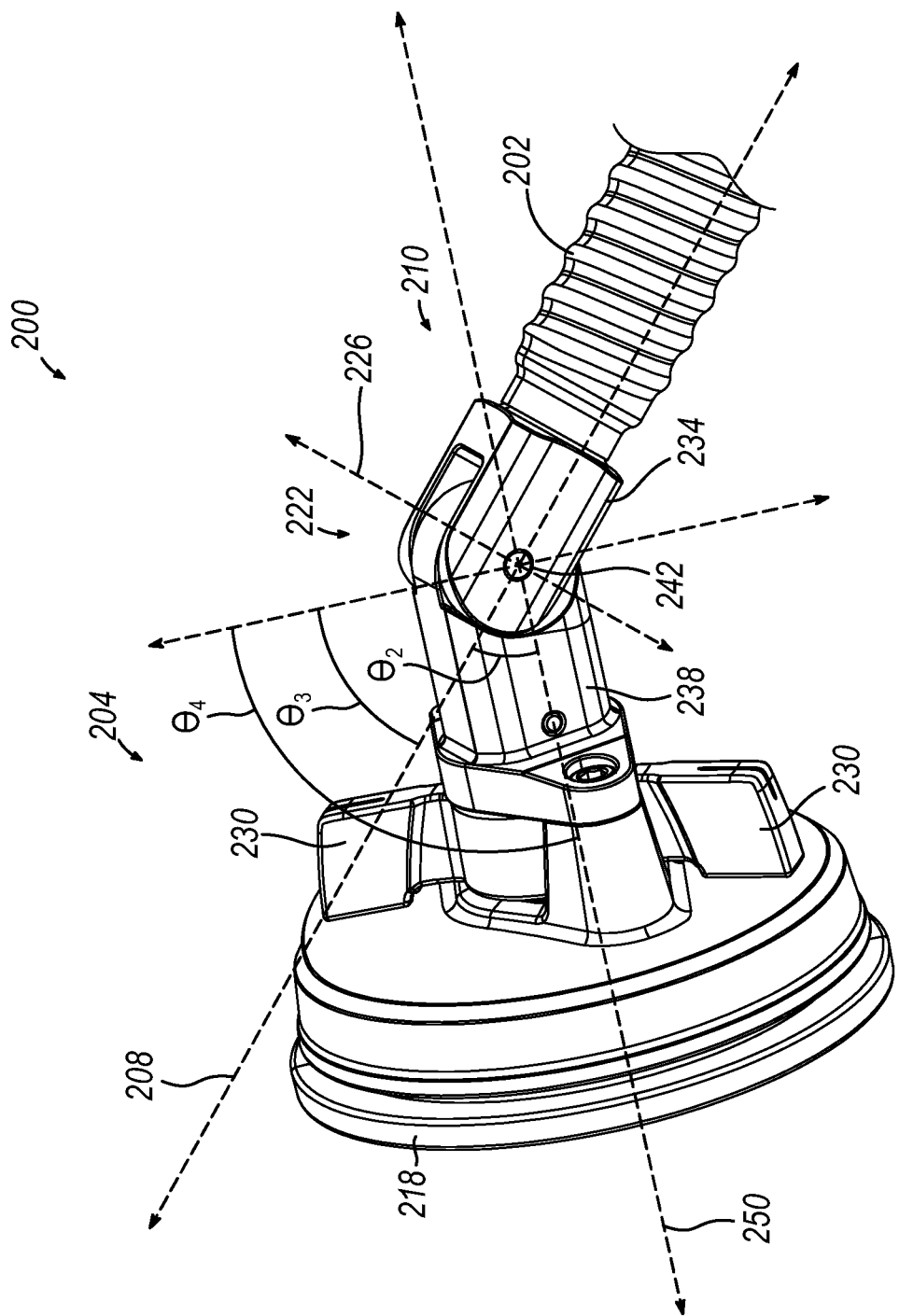
FIG. 4 depicts an enlarged, perspective view of a coupling member of FIG. 2, shown in a pivoted orientation.

Depicted in FIG. 4 is an enlarged view of coupling member (204), shown with pivotable coupling (222) in a pivoted orientation, wherein coupling member (204) defines an axis (250) with a pivot angles ($\Theta_2$, $\Theta_3$) of 45 degrees, respectively, relative to the longitudinal axis (208). More specifically, in the pivoted orientation, the coupling member (204) is arranged in a non-axial alignment with the body (202) to define a pivot angle $\Theta_4$. The pivotable coupling (222) is rotatable between pivot angle $\Theta_2$, approximately 45 degrees deflected away from the longitudinal axis (208) in a first direction, to pivot angle $\Theta_3$, approximately 45 degrees deflected away from the longitudinal axis (208) in an opposite direction. As such, pivotable coupling (222) is rotatable about approximately 90 degrees in total, which allows for greater flexibility when first connecting the fender (200) in a boat-to-boat or boat-to-dock application such that the boat does not need to be in exact horizontal alignment (relative to the water surface) with the other boat or dock during the initial coupling to allow the coupling members (204, 206) to fully engage. However, it should be understood that, depending on the application, including the strength of the coil spring (see, element 260 in FIG. 5) within the body (202), the total pivot angle may be increased or decreased to meet the required specifications.

Figure 5:
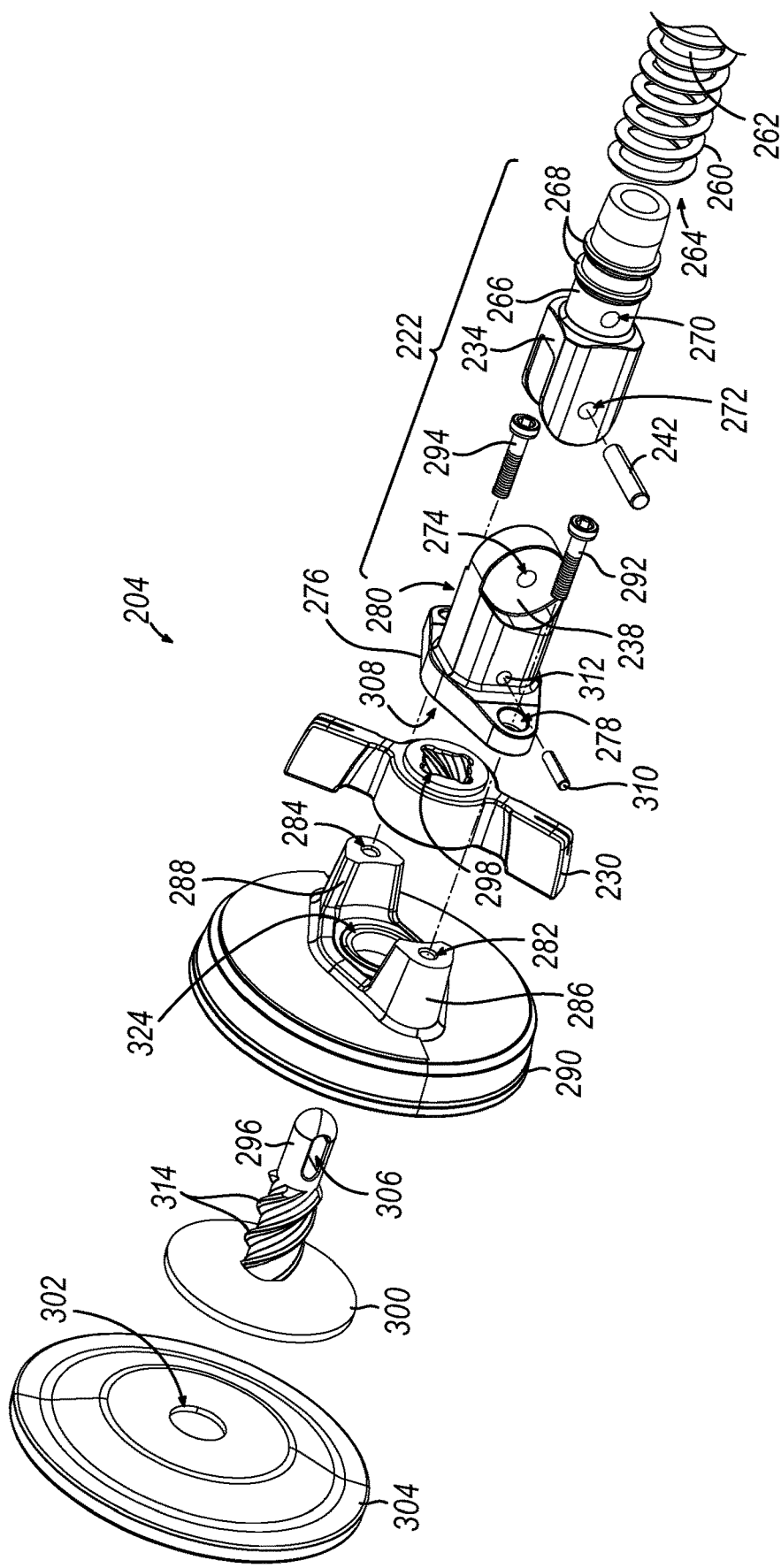
FIG. 5 depicts an exploded view of one end of the watercraft fender of FIG. 2, shown with the outer casing of the flexible spacer removed.
Figure 6:
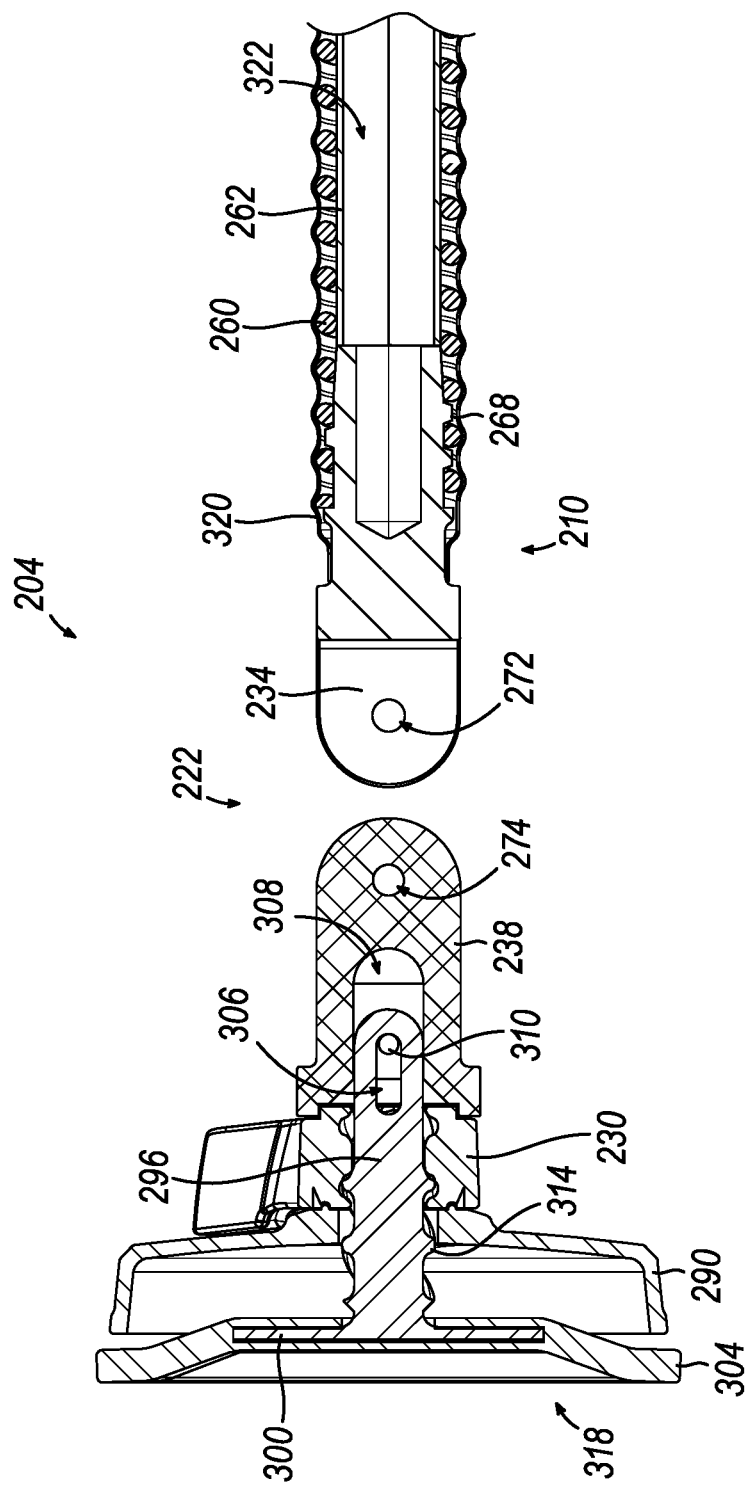
FIG. 6 depicts a cross-sectional view of one end of the watercraft fender of FIG. 2, taken along line FIG. 6-FIG. 6 of FIG. 3.
Figure 7:
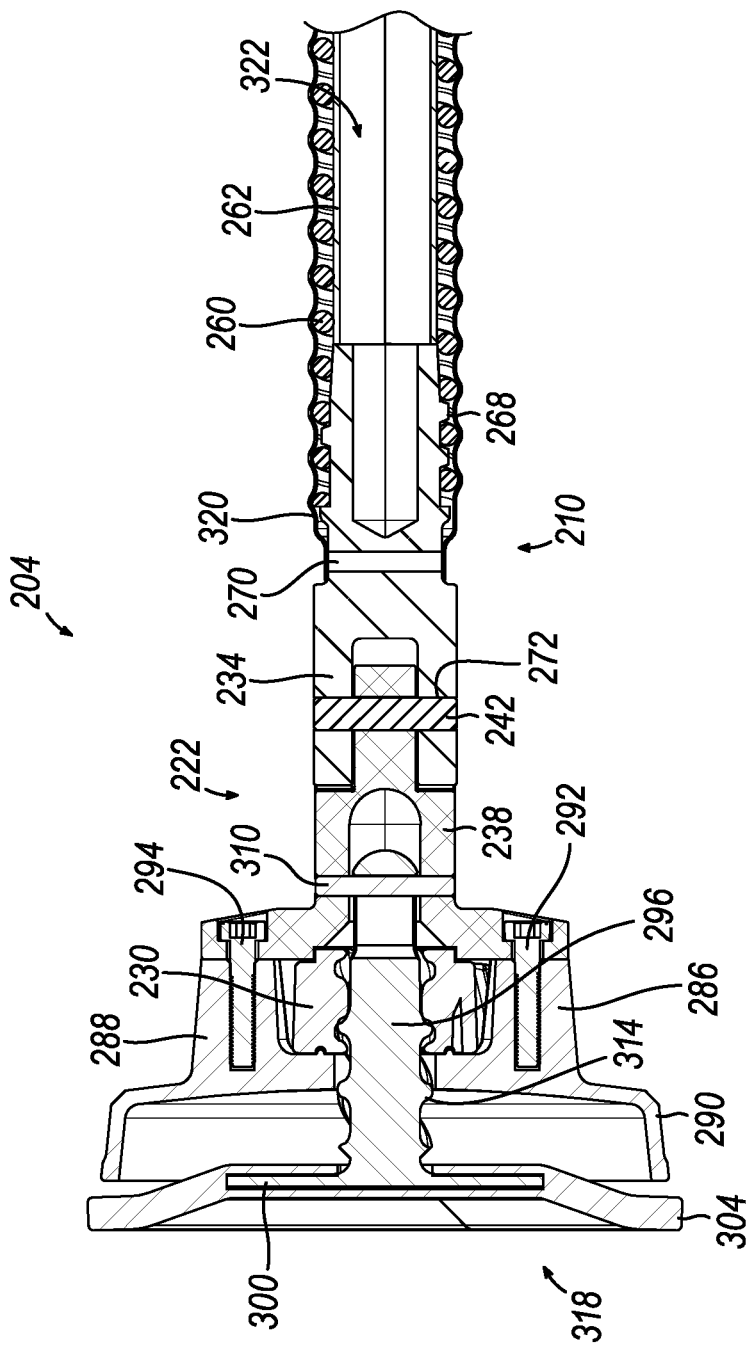
FIG. 7 depicts a cross-sectional view of one end of the watercraft fender of FIG. 2, taken along line FIG. 7-FIG. 7 of FIG. 3.
Figure 8:
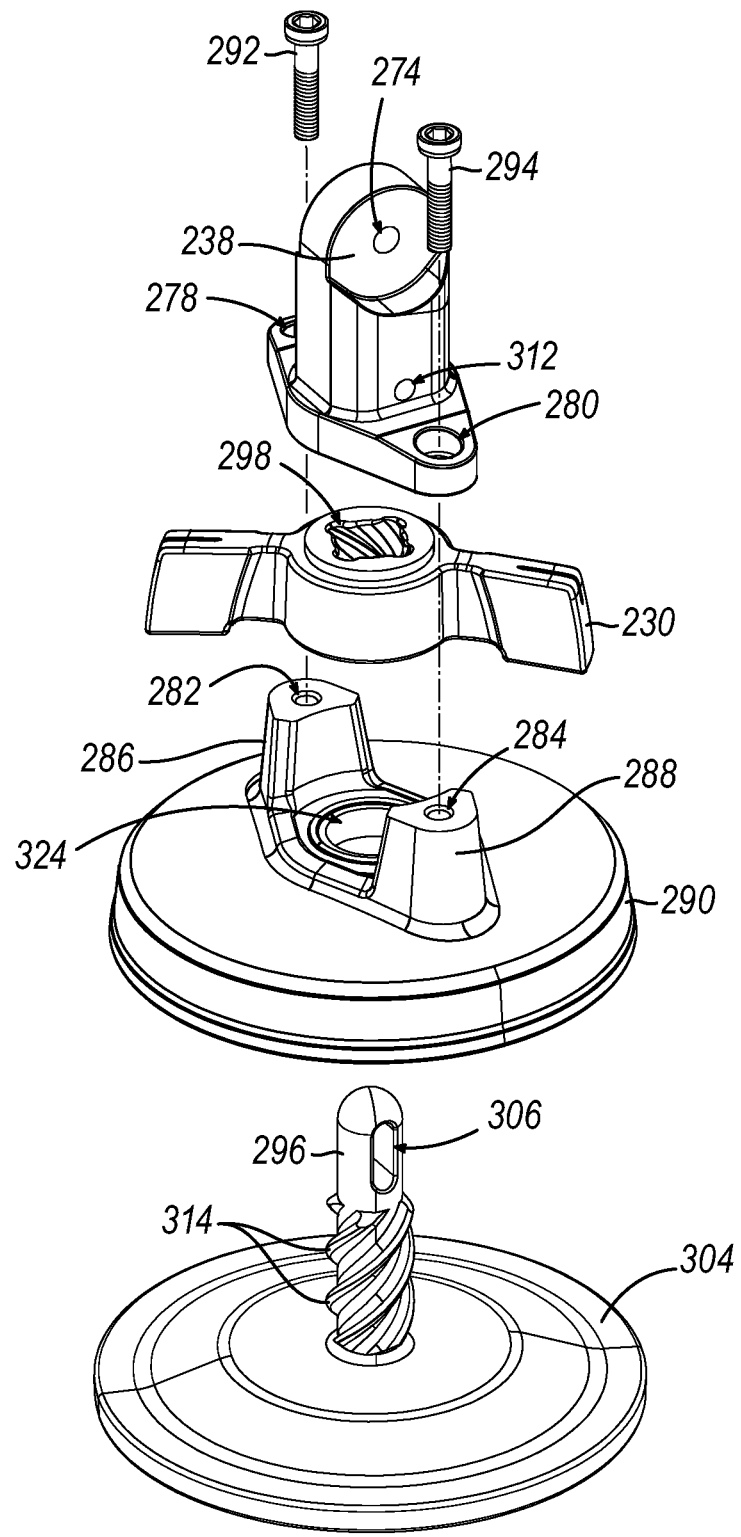
FIG. 8 depicts an assembly view of the coupling member of the watercraft fender of FIG. 2.

Depicted in FIGS. 5-8 are detailed views of one end (210) of fender (200). FIG. 5 is an exploded view, shown with the outer casing (see, element 320 in FIG. 6-7) of the body (202) removed to show the inner components, particularly, the coil spring (260) and the inner tube (262) positioned within the hollow central cavity (264) defined by the coil spring (260).

The coil spring (260) can be formed with metal, a metal alloy, or any other suitable materials which may provide spring-like compression, expansion, and deflection (i.e., longitudinal bending) characteristics. The inner tube (262) may be positioned throughout the length, or throughout a portion of the length, of the body (202) and particularly the coil spring (260). The inner tube (262) can be comprised of any flexible material, for example, nylon, polyurethane, polyethylene, or synthetic and/or natural rubber. The inner tube (262) may be positioned in the hollow central cavity (264) of the coil spring (262), wherein the tube (262) is configured to trap air (see, element 322 in FIGS. 6-7) or any other buoyant fluid, such by including air-tight end caps (not shown), and is thereby operable to provide floatation characteristics to the fender (200) if it were to be dropped into the water. In some embodiments, the tube (262) may also function to add rigidity to the coil spring (260). For example, the tube (262) can be comprised of materials capable of supplementing the rigidity of the coil spring (26), such as cross-linked polyethylene (PEX) or similar materials. Optionally, additional floatation devices (not shown) may be included on the outer surface of the coil spring (260) and outer casing (see, element 320 in FIG. 6-7) to provide additional floatation. Such devices, for example, can be inflatable or otherwise buoyant by way of the materials used (e.g., foam) used to form it.

In one example embodiment, the coil spring (260) can be a compression spring, such as Compression Spring Design No. 14483-0 manufactured by W.B. Jones Spring Company, Inc. of Wilder, KY This example embodiment of coil spring (260) includes an outer diameter of approximately 1.166 inches, an inner diameter of approximately 0.850 inches, and a length of approximately 21 inches. Further, this embodiment includes flat spring ends, a minimum compression length of approximately 12.500 inches, and 50 coil turns. While the above specifications describe one embodiment of a coil spring (260) which may be functional for some recreational boating applications, it should be understood that any or all of the characteristics of the coil spring (260) may be varied to meet the specifications needed in different applications.

Further, the coil spring (260) is coupled to the body fitting (234) via a connector arm (266). As illustrated, the outer diameter of the connector arm (266) may be formed slightly larger than the inner diameter of the coil spring (260), which may aid in coupling the coil spring (260) with the connector arm (266). To attach securely to the coil spring (260), the body fitting (234) can in some embodiments include spiral ridges (268). The spiral ridges (268) may assist with coupling the body fitting (234) with the coil spring (260) as the coil spring (260) can be rotated and threaded onto the body fitting (268). In alternative embodiments, the coil spring (260) may be crimped into a slot (not shown) formed on the surface of the connector arm (266) thereby promoting a fixed orientation of the coupling member.

In some embodiments, the body fitting (268) includes a bore hole (270) for coupling ropes, ties, strings, or any other similar devices during use, such as to secure the fender (200) from being dropped into the water unintentionally while securing it onto the hull of the boat.

As described above, the body fitting (234) couples the body (202) with the coupling member (204) via coupling member fitting (238) by aligning the holes (272, 274) and inserting a bolt (242) through the holes (272, 274) to rotatably secure the pivotable coupling (222). The coupling member fitting (238) is fixed to the suction housing (290) by inserting bolts (292, 294) through holes (278, 280) of coupling member fitting (238) and securing them into threaded openings (282, 284) on the proximal end of legs (286, 288) of suction housing (290). However, before fixing coupling member fitting (238) to the suction housing (290), rotational drive member (230) is inserted in the middle of legs (286, 288) and the helical drive shaft (296) is inserted through opening (324) (see, FIG. 8) of suction housing (290) and through opening (298) of rotational drive member (230). The helical drive shaft (296) is coupled with a drive plate (300) which is inserted into an inner cavity (302) of the suction cup (304). Further, the helical drive shaft includes an elongated opening (306) on the proximal end which is shaped to insert into a drive cavity (308) centrally located in the coupling member fitting (238), and a second pin (310) or other similar member is inserted through hole (312) to secure the helical drive shaft (296) and suction cup (304) from separating from the other components. The elongated opening (306) is elongated such that the helical drive shaft (296) may translate distally and proximally through the coupling member fitting (238) as the rotational drive member (230) is rotated. In some embodiments, the rotational drive member (230) may be rotatable from 60 to 90 degrees from the un-rotated to the fully-rotated position, and in some exemplary embodiments the rotational drive member (230) may be rotatable about 80 degrees from the un-rotated to the fully-rotated position.

The materials for each component can be selected based upon the application and particular strength of the materials that will be required for the fender (200) to function adequately as described herein. In some embodiments, the suction housing (290) includes nylon, the rotational drive member (230) includes nylon, aluminum, or plastic, and the pivotable coupling (222) components include aluminum or glass-filled nylon. However, various other materials or combinations of materials may be suitable for each component.

The suction cup (304) can include a dimple (see, element 318 in FIG. 6-7) to further increase the suctioning grip. The suction cup (304) is made of rubber, plastic, thermoplastic polyurethane (TPU), or other material having sufficiently elastically resilient properties such that, when the suction cup (304) is pressed against a smooth surface, the volume of the dimple (see, element 318 in FIG. 6-7) is reduced, thereby forcing air to be expelled so that the suction cup (304) forms an air-tight seal against the smooth surface. Atmospheric pressure outside the suction cup (304) retains the suction cup (304) against the surface. When the air-tight seal is broken, air rushes into the suction cup (304), releasing the vacuum and the suction attachment to the surface. Whereupon the elastically resilient material of the suction cup (304) returns to its relaxed condition. The suction cup (304) can thereafter be repeatedly reused. In some embodiments, the suction cup (304) is between 4-5 inches in diameter; however, it should be understood that the size of the suction cup (304), an any other components, may be varied based upon the intended application.

Further, opening (298) includes a helical drive pattern, or threading, spanning the interior surface of the opening (230) which is shaped to mate with helical ridges (314) wrapping circumferentially around the exterior surface of the helical drive shaft (296). As such, in operation, as the rotational drive member (230) is rotated, the helical drive shaft (296) is translated axially (i.e., distally and proximally) relative to the body (202), and therefore the suction cup (304) is also translated axially relative to the suction housing (290). As such, rotation of the rotational drive member (230) is operable to manipulate the suction cup (304) to create the vacuum seal described above.

Depicted in FIGS. 9A-E are various assembly diagrams illustrating an alternative embodiment of a coupling member (404) which may be coupled with the body (202) of the fender (200). Coupling member (404) can be configured to function in the same or similar manner as coupling member (204), subject to the differences described below. Coupling member (404) includes a coupling member fitting (406) which may be coupled to a suction housing (408) by inserting pins or bolts (not shown) into the legs (410, 412) of the housing (408) through one or more threaded holes (414, 416). Similar to coupling member fitting (238), coupling member fitting (404) includes a hole (418) for receiving a pin (not shown) to pivotably connect to the body (420), and is configured to rotate similar to pivotable coupling (222) shown and described above. Also similar to coupling member (204), the suction cup (450) can include an inner cavity (not shown) for accepting a plate (not shown) at the distal end of a drive shaft (452), and the proximal end of the drive shaft (452) extends up through a central opening (454) in the suction housing (408) to abut a distal surface (456) of the coupling member fitting (406). Further, a slidable cam member (422) is sized and shaped to slide along a track (424) through the legs (410, 412) of the suction housing (408), and through a slit (458) in the drive shaft (452). The slidable cam member (422) includes a ramped cam surface (426) having a protrusion (428) shaped to mate with a notch (460) within the slit (458) of the drive shaft (452). Still further, a spring (462) can be included between the suction cup (450) and the suction housing (408) to bias the suction cup (450) axially in a distal direction relative to the body (420). As the slidable cam member (422) is slid in a first radial direction along the track (424), the ramped cam surface (426) is operable to compress the spring (462) by pulling the suction cup (450) toward the suction housing (408), thereby creating a suction vacuum similar to the suction vacuum described above with reference to coupling member (204). As the slidable cam member (422) is slid in a second, opposite radial direction from the first radial direction along the track (424), the ramped cam surface (426) is operable to decompress the spring (462) by releasing the suction cup (450) away from the suction housing (408), thereby releasing the suction vacuum.

Figure 10:
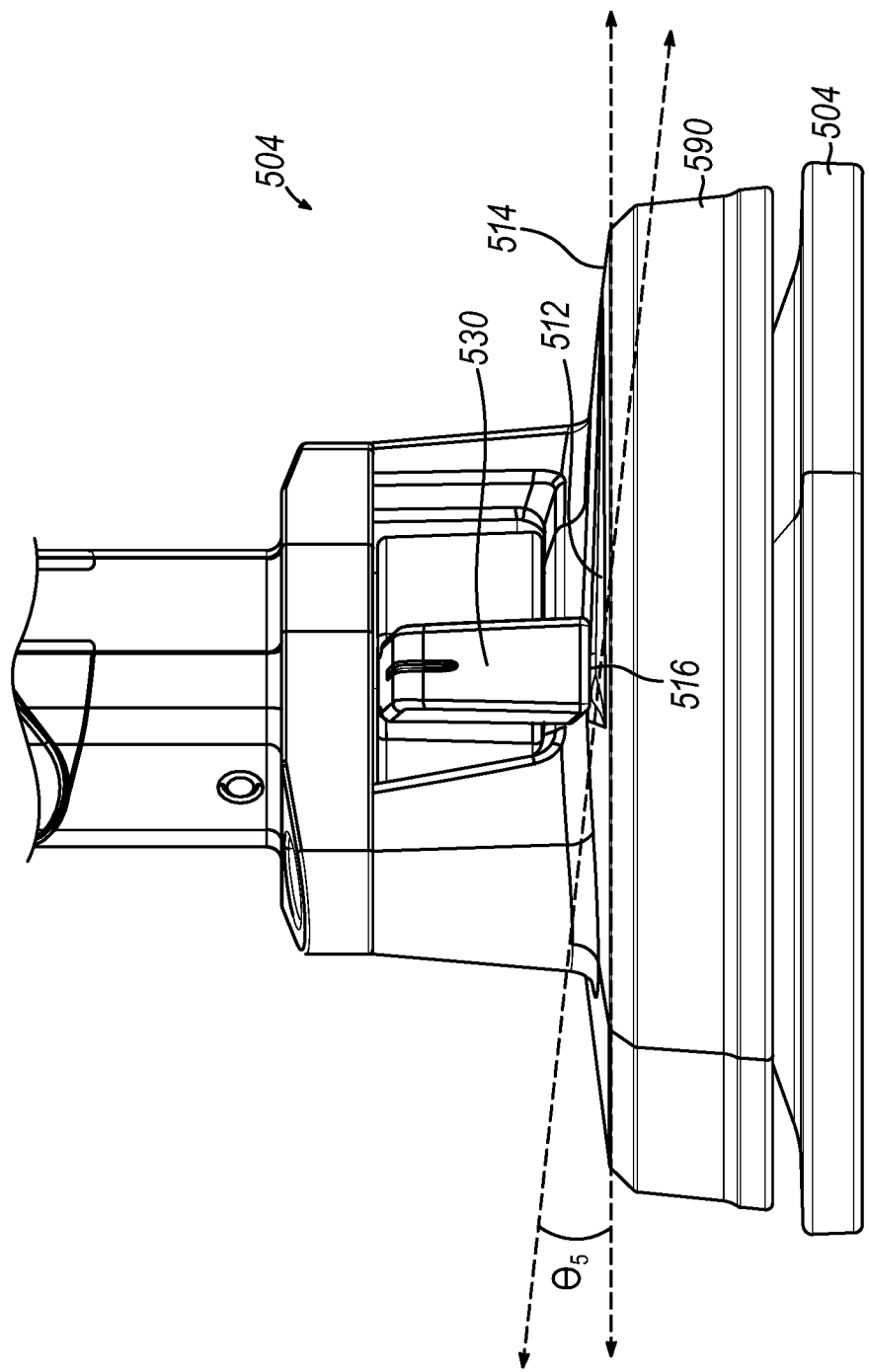
FIG. 10 depicts an enlarged, side view of an alternative embodiment of a coupling member having a locking mechanism.
Figure 11:
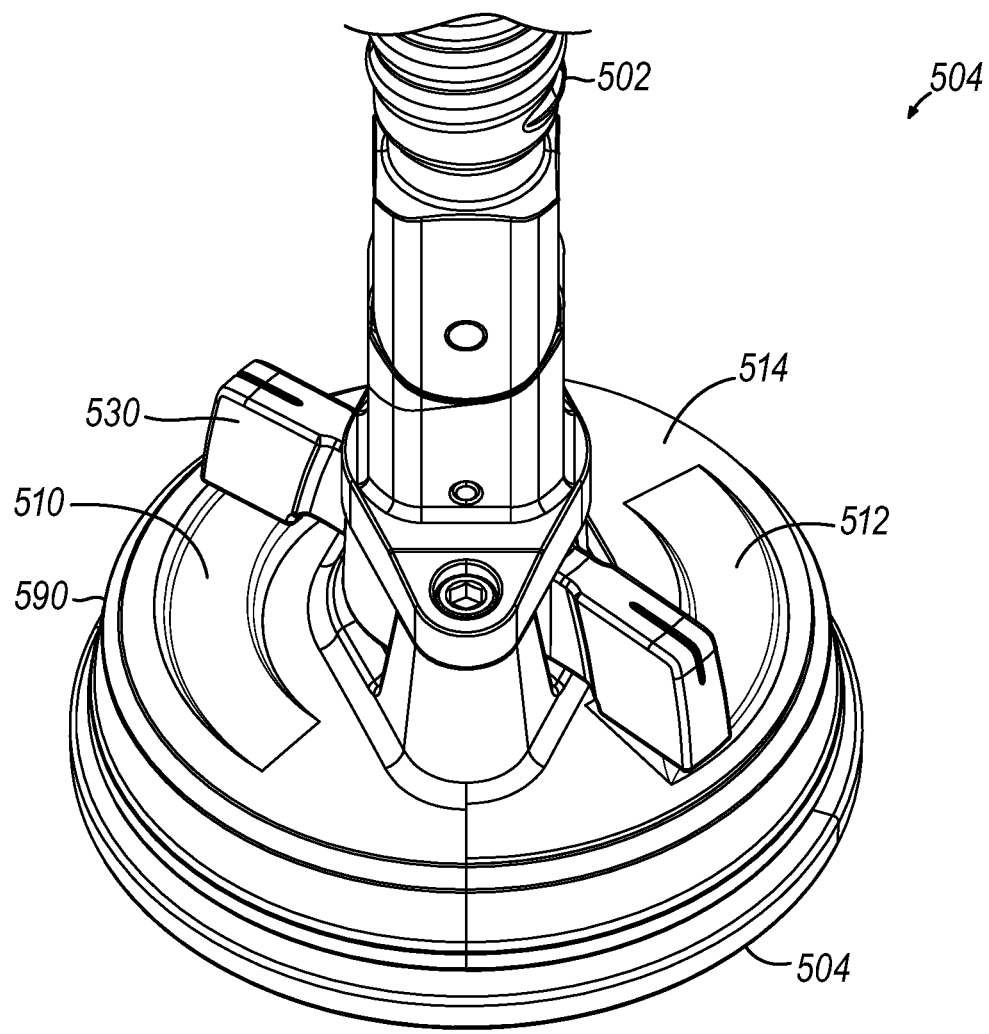
FIG. 11 depicts an enlarged, perspective view of the embodiment of the coupling member of FIG. 10.

Depicted in FIGS. 10-11 is an alternative embodiment of a coupling member (504) which may be coupled with the body (202) of the fender (200). Coupling member (504) can be configured to operate in the same or similar manner as coupling member (204) and function in the same or similar manner as coupling members (204, 404), subject to the differences described below. Particularly, in operation, as the rotational drive member (530) is rotated, the helical drive shaft (not shown) is translated axially (i.e., distally and proximally) relative to the body (502), and therefore the suction cup (504) is also translated axially relative to the suction housing (590). As such, rotation of the rotational drive member (530) is operable to manipulate the suction cup (504) to create a vacuum seal. To ensure the rotational drive member (530) remains secured, or locked, into place, one or more raised portions (510, 512) can be formed onto the upper surface (514) of the suction housing (590). The raise portions (510, 512) are provided along a path of which will come into contact with the lower surface (516) as it is rotated. Further, the raised portions (510, 512) can include a ramped incline at angle $\Theta_5$ whereby the resistance or pressure increases between the lower surface (516) of the rotational drive member (530) as the rotational drive member (530) is rotated and the suction cup (504) is translated proximally toward the suction housing (590). In some embodiments, the incline angle $\Theta_5$ may be approximately between one degree and five degrees relative to the upper surface (514) of the suction housing (590). In any case, the incline angle $\Theta$ is provided such that the pressure between the lower surface (516) of the rotational drive member (530) is operable to resist the rotational drive member (530) from freely rotating away from the fully rotated and "locked" position without user interaction. In some embodiments, tactile feedback may be included with the ramped locking mechanism. For example, a protrusion (not shown) may be included on the lower surface (516) of the rotational drive member (530) which is configured to mate with a detent (not shown) at the peaks of the raised portions (510, 512), the protrusion and detent being operable to provide an audible click to indicate the rotational drive member (530) has reached the fully locked position, and also to provide additional locking resistance. In alternative embodiments, the protrusion (not shown) may instead be included on the lower surface (516) of the rotational drive member (530) which is configured to mate with a detent (not shown) on the peaks of the raised portions (510, 512).

Figure 12:
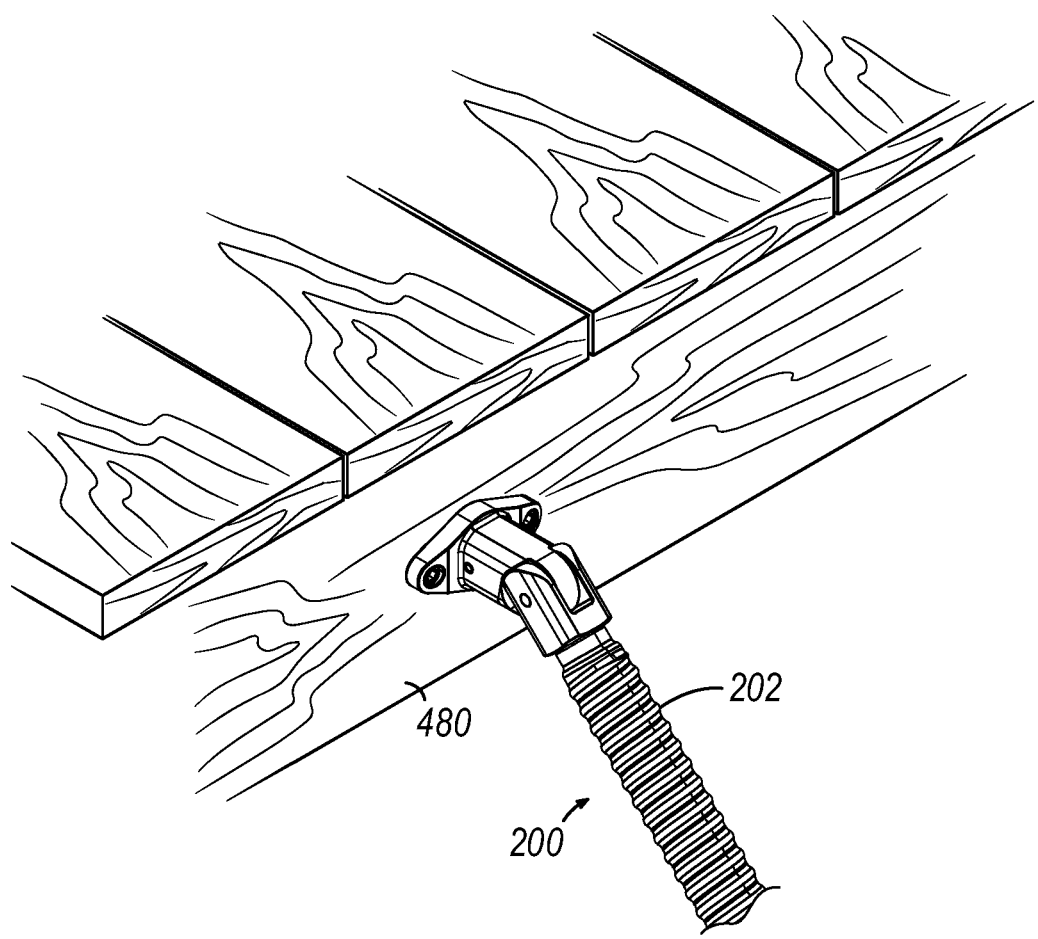
FIG. 12 depicts a perspective view of another environment of use of an alternative watercraft fender embodiment, with the coupling member at one end shown removed and the fender coupled with a boat dock, with the opposing coupling member (not shown) configured to include a coupling member to couple to the hull of a watercraft during mooring.

Depicted in FIG. 12 is an alternative environment of use of a watercraft fender, such as fender (200) described herein, whereby the coupling member (204) on one end (210) is removed and configured to couple directly with a surface (480) other than the hull of a boat, such as a wooden boat dock or other similar structure. In this embodiment, the bolts (242, 244) can be removed such that the coupling member (204) is disconnected and removed from the end (210) of the body (202). Thereafter, the bolts (242, 244) can be used to attach the fender (200) to the surface (480). In other embodiments, an attachment (not shown) may be coupled with the body (202) using the bolts (242, 244) which is operable to couple with other surfaces, such as a metal cleat commonly affixed to docks for tying off ropes. For example, the attachment can include a durable lock configured to firmly attach to the cleat.

In some embodiments, such as those described above, the other end (212) of the fender (200) includes the coupling member (206) for coupling with the hull of a boat, such as by suctioning as shown and described herein. As such, a boat can be safety and effectively coupled with a boat dock or other structure where a suctioning device would be ineffective.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used or applied in combination with some or all of the features of other embodiments unless otherwise indicated. One or more exemplary embodiments have been shown and described, and all changes and modifications that come within the spirit of the disclosure are desired to be protected.

We claim:
1. An apparatus, comprising:
   (a) an elongated body defining a longitudinal axis, wherein the elongated body includes first and second opposing ends and the elongated body is formed by a flexible coil spring extending between the first and second opposing ends;
   (b) a first coupling member coupled to the first end of the elongated body, wherein the first coupling member includes:
      (i) a first suction cup, and
      (ii) a first pressure mount actuatable to selectively lock or release the first suction cup from a first surface of a first watercraft; and
   (c) a second coupling member coupled to the second end of the elongated body, wherein the second coupling member includes:
      (i) a second suction cup, and
      (ii) a second pressure mount actuatable to selectively lock or release the second suction cup from a second surface of a second watercraft,
   wherein the elongated body is configured to separate the first watercraft from the second watercraft while each of the first watercraft and the second watercraft is in a mooring state.

2. The apparatus of claim 1, wherein the first coupling member is configured to pivot about a range of motion relative to the elongated body about a pivot axis, wherein the pivot axis is perpendicular to the longitudinal axis.

3. The apparatus of claim 2, wherein the range of motion is about 90 degrees.

4. The apparatus of claim 1, wherein the first pressure mount is configured to rotate about the longitudinal axis, wherein a rotation of the first pressure mount in a first rotational direction is configured to engage the first suction cup to the first surface, wherein a translation of the first pressure mount in a second rotational direction opposite the first rotational direction is configured to disengage the first suction cup from the first surface.

5. The apparatus of claim 1, further comprising: a hollow cavity formed within the elongated body.

6. The apparatus of claim 5, further comprising a tube positioned within the hollow cavity, wherein the tube is configured to hold a gas volume adequate to provide buoyancy of the apparatus in water.

7. The apparatus of claim 1, wherein the flexible coil spring is encased in a shrink wrap material.

8. The apparatus of claim 1, wherein the flexible coil spring is encased in a rubber material.

9. A watercraft fender, comprising:
(a) a flexible coil spring defining a longitudinal axis, wherein the flexible coil spring includes first and second opposing ends; and
(b) a first coupling member coupled to the first end of the flexible coil spring, wherein the first coupling member includes:
   (i) a first suction cup, and
   (ii) a first pressure mount actuatable to selectively lock or release the first suction cup from a first surface, wherein the first pressure mount is configured to rotate about the longitudinal axis, wherein a rotation of the first pressure mount in a first rotational direction is configured to engage the first suction cup to the first surface, wherein a translation of the first pressure mount in a second rotational direction opposite the first rotational direction is configured to disengage the first suction cup from the first surface.

10. The watercraft fender of claim 9, wherein the first coupling member is configured to pivot about a range of motion relative to the flexible coil spring about a pivot axis, wherein the pivot axis is perpendicular to the longitudinal axis.

11. The watercraft fender of claim 10, wherein the range of motion is about 90 degrees.

12. The watercraft fender of claim 9, further comprising: a second coupling member pivotally coupled to the second end of the flexible coil spring, wherein the second coupling member includes a second suction cup and a second pressure mount operable to selectively lock or release the second suction cup from a second surface.

13. The watercraft fender of claim 9, further comprising: a second coupling member pivotally coupled to the second end of the flexible coil spring, wherein the second coupling member includes a bracket configured to fixedly attach to a surface.

14. The watercraft fender of claim 9, further comprising: a hollow cavity within the flexible coil spring; and
a tube positioned therethrough the hollow cavity, wherein the tube is configured to hold a gas volume adequate to provide buoyancy of the watercraft fender in water.

15. A method of operating a watercraft fender, wherein the watercraft fender includes (a) an elongated body defining a longitudinal axis, wherein the elongated body includes a flexible coil spring with first and second opposing ends, (b) a first coupling member coupled to the first end of the elongated body, and (c) a second coupling member coupled to the second end of the elongated body, the method comprising:
(a) contacting the first coupling member of the elongated body to a first watercraft, wherein the first coupling member includes:
   (i) a first suction cup, and
   (ii) a first pressure mount actuatable to selectively attach or release the first suction cup to a surface;
(b) actuating the first pressure mount to attach the first suction cup to the first watercraft;
(c) contacting the second coupling member of the elongated body to a second watercraft, wherein the second coupling member includes:
   (i) a second suction cup, and
   (ii) a second pressure mount actuatable to selectively attach or release the second suction cup to a surface; and
(d) actuating the second pressure mount to attach the second suction cup to the second watercraft.

16. The method of claim 15, wherein the first coupling member is configured to pivot about a range of motion relative to the elongated body about a pivot axis, wherein the pivot axis is perpendicular to the longitudinal axis, wherein the suction cup defines a planar suction face having a dimple, the method further comprising: prior to contacting the first coupling member of the elongated body to a first watercraft, pivoting the first coupling member to align the planar suction face with a surface of the first watercraft surface.

17. The method of claim 15, wherein the flexible coil spring defines a bore, wherein the bore is configured to trap air to provide floatation characteristics to the watercraft fender.

18. An apparatus, comprising:
(a) an elongated body defining a longitudinal axis, wherein the elongated body includes first and second opposing ends;
(b) a first coupling member coupled to the first end of the elongated body, wherein the first coupling member includes:
   (i) a first suction cup, and
   (ii) a first pressure mount actuatable to selectively lock or release the first suction cup from a first surface of a first watercraft; and
(c) a second coupling member coupled to the second end of the elongated body, wherein the second coupling member includes:
   (i) a second suction cup, and
   (ii) a second pressure mount actuatable to selectively lock or release the second suction cup from a second surface of a second watercraft,
wherein the elongated body is configured to separate the first watercraft from the second watercraft while each of the first watercraft and the second watercraft is in a mooring state, and
wherein the first pressure mount is configured to rotate about the longitudinal axis, wherein a rotation of the first pressure mount in a first rotational direction is configured to engage the first suction cup to the first surface, wherein a translation of the first pressure mount in a second rotational direction opposite the first rotational direction is configured to disengage the first suction cup from the first surface.

* * * * *